United States Patent
Liang et al.

(10) Patent No.: US 11,298,660 B2
(45) Date of Patent: Apr. 12, 2022

(54) ELECTROCHEMICAL SYSTEM WITH CONCENTRATION RECIRCULATION IN CYCLIC BATCH MODE

(71) Applicant: Evoqua Water Technologies, LLC, Pittsburgh, PA (US)

(72) Inventors: Li-Shiang Liang, Harvard, MA (US); Michael J. Shaw, Derry, NH (US); Wenxin Du, Dover, NH (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 223 days.

(21) Appl. No.: 16/098,591

(22) PCT Filed: May 4, 2017

(86) PCT No.: PCT/US2017/031145
§ 371 (c)(1),
(2) Date: Nov. 2, 2018

(87) PCT Pub. No.: WO2017/192907
PCT Pub. Date: Nov. 9, 2017

(65) Prior Publication Data
US 2020/0215489 A1 Jul. 9, 2020

Related U.S. Application Data

(60) Provisional application No. 62/332,536, filed on May 6, 2016.

(51) Int. Cl.
*B01D 61/44* (2006.01)
*C02F 1/469* (2006.01)

(52) U.S. Cl.
CPC ............ *B01D 61/44* (2013.01); *C02F 1/4693* (2013.01); *C02F 1/4695* (2013.01)

(58) Field of Classification Search
CPC ....... B01D 61/44; C02F 1/4693; C02F 1/4695
See application file for complete search history.

(56) References Cited

U.S. PATENT DOCUMENTS

| | | | |
|---|---|---|---|
| 2005/0103644 A1* | 5/2005 | Wilkins | B01D 61/48 205/751 |
| 2007/0215474 A1 | 9/2007 | Batchelder et al. | |
| 2015/0027890 A1* | 1/2015 | Jha | B01J 39/05 204/520 |
| 2015/0166375 A1 | 6/2015 | Freydina et al. | |
| 2016/0010222 A1 | 1/2016 | Jha et al. | |

* cited by examiner

*Primary Examiner* — Salil Jain (57) ABSTRACT

A method of operating an electrochemical device includes periodically discharging a volume of concentrate reject in a timed batch cycle and replacing the concentrate reject with feed water. An electrochemical water treatment system includes a recycle line having a valve controlled by a control module. The control module periodically opens the valve to discharge concentrate reject from the recycle line in a batch timed cycle. The recycle line is fed with feed water to replace the discharged concentrate reject.

11 Claims, 7 Drawing Sheets

ELECTROCHEMICAL SYSTEM WITH CONCENTRATION RECIRCULATION IN CYCLIC BATCH MODE

RELATED APPLICATIONS

This application claims priority under 35 U.S.C. § 119(e) to U.S. Provisional Application Ser. No. 62/332,536 titled "ED System with Concentration Recirculation in Cyclic Batch Mode" filed on May 6, 2016, which is herein incorporated by reference in its entirety.

FIELD OF TECHNOLOGY

Aspects and embodiments disclosed herein relate to electrochemical water treatment systems and methods of operating the same. More particularly, aspects and embodiments disclosed relate to electrochemical systems capable of periodically discharging concentrate reject in a batch timed cycle and methods of operating an electrochemical separation device by periodically discharging concentrate reject in a batch timed cycle.

SUMMARY

In accordance with an aspect, there is provided a method of operating an electrochemical separation device. The electrochemical separation device may comprise a dilution compartment, a concentration compartment, an ion exchange membrane, first and second electrodes, a first feed stream fluidly connected to the dilution compartment, a second feed stream fluidly connected to the concentration compartment, and a concentration compartment recycle stream.

In some embodiments, the method comprises directing the first feed stream to the dilution compartment to produce a product stream and directing the second feed stream to the concentration compartment to produce a reject stream. The method may comprise recycling the reject stream to the concentration compartment. The method may further comprise periodically discharging a volume of the reject stream having a first concentration of ions in a timed batch cycle. The method may comprise replacing the discharged volume of reject stream with an essentially equivalent volume of the second feed stream having a second concentration of ions lower than the first concentration of ions.

In some embodiments, the method comprises periodically reversing a polarity of the first and second electrodes. Alternately or additionally, the method may further comprise exchanging flow paths of the first feed stream and the second feed stream, such that the first feed stream is directed to the concentration compartment and the second feed stream is directed to the dilution compartment. The periodic reversal of the polarity may be coordinated with a timing of the periodic discharge of the reject stream. The exchanging of the flow paths may be coordinated with the timing of the periodic reversal of the polarity and/or the timing of the periodic discharge of the reject stream.

In some embodiments, the method further comprises blending the reject stream with the second feed stream to produce a reject and second feed blend. In such embodiments, the method may comprise discharging a volume of the reject and second feed blend. The method may further comprise replacing the discharged volume of the reject and second feed blend with an essentially equivalent volume of the second feed stream.

In some embodiments, the method further comprises blending the reject stream with a third feed stream to produce a reject and third feed blend. The third feed may have a third concentration of ions lower than the second concentration of ions. The reject stream may be blended with both the second feed stream and the third feed stream to produce a reject, second feed, and third feed blend. In such embodiments, the method may comprise discharging a volume of the reject and third feed blend or of the reject, second feed, and third feed blend. The method may further comprise replacing the discharged volume of the reject and third feed blend or of the reject, second feed, and third feed blend with an essentially equivalent volume at least one of the second feed stream and the third feed stream.

The method may comprise periodically discharging the volume of the reject stream when the first concentration of ions reaches a concentration sufficient to form a precipitate. Discharging the reject and replacing it with second feed stream or third feed stream, each having a lower concentration of ions than the reject, may reduce the overall ionic concentration of the recycled stream.

In some non-limiting embodiments, the volume of the reject stream may be periodically discharged for about 0.5 minutes to about 2.0 minutes. The reject stream may be discarded in timed batch cycles of between about 15 minutes to about 25 minutes.

In accordance with another aspect, there is provided a water treatment system comprising an electrochemical separation device. In accordance with some embodiments, the electrochemical separation device is one of an electrodialysis device and an electrodeionization device.

The electrochemical separation device may comprise a dilution compartment having an inlet and a product outlet, a concentration compartment having an inlet and a reject outlet, an ion exchange membrane positioned between the dilution compartment and the concentration compartment, and first and a second electrodes positioned at distal ends of the electrochemical separation device. The system may further comprise a first feed line fluidly connected to the dilution compartment inlet and a second feed line fluidly connected to the concentration compartment inlet. The system may comprise a recycle line fluidly connected to the reject outlet and the inlet of the concentration compartment.

In some embodiments, the system further comprises a control module in electrical communication with a valve positioned on the recycle line. The control module may be configured to periodically discharge a volume of concentrate reject from the recycle line in a batch timed cycle. The control module may further be configured to deliver an essentially equivalent volume of second feed to the concentration compartment.

The system may further comprise one or more sensors. In some embodiments, the system comprises a sensor fluidly connected to at least one of the reject outlet and the product outlet and configured to measure at least one of ionic concentration, pH, and flow rate of the concentrate reject or a product. In some embodiments, the system comprises one or more sensors fluidly connected to the recycle line and/or concentration compartment, and configured to measure absolute pressure or a pressure differential within the recycle line and/or concentration compartment. In some embodiments, the system comprises a sensor electrically connected to the first electrode and the second electrode and configured to measure voltage and/or current across the electrodes.

The control module may be electrically connected to the one or more sensors and configured to act in response to a measurement received from the one or more sensors. In some embodiments, the control module is electrically connected to the reject outlet and/or product outlet sensor and configured to discharge a volume of concentrate reject in response to the measurement of at least one of the ionic concentration, the pH, and the flow rate of the reject or product. In some embodiments, the control module is electrically connected the recycle line sensor and configured to discharge a volume of concentrate reject in response to the measurement of the absolute pressure or pressure differential within the recycle line and/or concentration compartment. In some embodiments, the control module is electrically connected to the first and second electrode sensor and configured to discharge a volume of concentrate reject in response to the measurement of one of the voltage and current across the electrodes.

In certain embodiments the system further comprises a blending tank positioned within the recycle line. The blending tank may be configured to receive and blend the concentrate reject and the second feed, to produce a reject and second feed blend. The system may comprise a valve positioned downstream from the blending tank and the control module may be configured to periodically discharge a volume of the reject and second feed blend. The control module may further be configured to deliver the volume of second feed to the blending tank. In some embodiments, the system comprises a sensor fluidly connected to the blending tank and configured to measure at least one of ionic concentration and pH of the reject and second feed blend. The control module may further be configured to discharge reject and second feed blend in response to a measurement of the ionic concentration or pH of the blend.

In accordance with certain embodiments, the system may comprise a valve positioned upstream from the blending tank. The upstream valve may be configured to selectively discharge the concentrate reject from the system or to deliver the concentrate reject to the blending tank.

The system may further comprise more than one blending tank positioned within the recycle line in a parallel configuration. In some embodiments, at least one of the more than one blending tank is configured to be in fluid communication with the concentration compartment while at least one of the more than one blending tank is configured to be on stand-by. The tank that is on stand-by may be configured to receive at least one of the concentrate reject, the second feed, or the third feed.

In some embodiments, the system may comprise a blending tank positioned within the recycle line and configured to receive and blend the concentrate reject and at least one of the second feed and a third feed, to produce a reject and feed blend. The system may comprise a three way valve positioned upstream from the blending tank, configured to direct one of the second feed and the third feed into the blending tank.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with an aspect, there is provided a method of operating an electrochemical separation device. Electrochemical separation devices disclosed herein may comprise a dilution compartment, a concentration compartment, an ion exchange membrane, and first and second electrodes. The ion exchange membrane may be positioned between the dilution compartment and the concentration compartment. Systems and methods disclosed herein may further include a first feed stream or first feed line fluidly connected to the dilution compartment, a second feed stream or second feed line fluidly connected to the concentration compartment, and a concentration compartment recycle stream or recycle line.

As used herein, "electrochemical separation device" refers to a device for purifying fluids using an electrical field. Electrochemical separation devices may be commonly used to treat water and other liquids containing dissolved ionic species. Electrochemical separation devices include, but are not limited to, electrodeionization and electrodialysis devices. In some embodiments, the electrochemical device has a plate-and-frame or spiral wound design. Such designs may be used for various types of electrochemical deionization devices including but not limited to electrodialysis and electrodeionization devices. Commercially available electrodialysis devices are typically of plate-and-frame design, while electrodeionization devices may be available in both plate and frame and spiral configurations.

Generally, electrochemical separation devices may employ an electric potential to influence ion transport and remove or reduce a concentration of one or more ionized or ionizable species from a fluid. Electrochemical devices may be operated to promote one or more electrochemical reactions specifically designed to achieve or enhance separation performance. For instance, electrochemical devices may drive ion transport in a specific direction through selectively permeable membranes by allowing ion transport in a specific direction, and preventing ion transport in another specific direction. In certain embodiments, electrochemical devices may comprise electrically active membranes, such as semipermeable or selectively permeable ion exchange or bipolar membranes.

Electrodeionization (EDI) systems may further employ electrically active media to separate the one or more ionized or ionizable species from the fluid. The electrically active media typically serves to alternately collect and discharge ionic and/or ionizable species and, in some cases, to facilitate the transport of ions. The transport of ions may occur continuously, for instance by ionic or electronic substitution mechanisms. EDI devices can comprise electrochemically active media of permanent or temporary charge, and may be operated batch-wise, intermittently, continuously, and/or even in reversing polarity modes.

One embodiment of EDI is continuous electrodeionization (CEDI). CEDI devices are EDI devices known to those skilled in the art that operate in a manner in which water purification can proceed continuously, while ion exchange material is continuously recharged. CEDI techniques may include processes such as continuous deionization, filled cell electrodialysis, or electrodiaresis. Under specific controlled voltage and salinity conditions in CEDI systems water molecules can be split to generate hydrogen or hydronium ions or species and hydroxide or hydroxyl ions or species that can regenerate ion exchange media in the device and thus facilitate the release of the trapped species therefrom. In this way, a water stream to be treated may be continuously purified without requiring chemical recharging of ion exchange resin.

Electrodialysis (ED) devices operate similarly to EDI devices (i.e. alternately collecting and discharging species in batch-wise processes, intermittently, continuously, or in reversing polarity modes). However, ED devices typically do not contain electroactive media between the membranes. Because of the lack of electroactive media, the operation of ED devices may be hindered on feed waters of low salinity having an elevated electrical resistance. Also, because the operation of ED on high salinity feed waters can result in elevated electrical current consumption, ED devices have heretofore been most effectively used on source waters of intermediate salinity. In ED based systems, because there is no electroactive media, splitting water is inefficient and operating in such a regime is generally avoided.

In certain electrochemical separation devices, such as those employed in systems and methods disclosed herein, a plurality of adjacent cells or compartments may be separated by selectively permeable membranes that allow the passage of either positively or negatively charged species, but typically not both. Dilution or depletion compartments are typically interspaced with concentrating or concentration compartments in such devices. As water flows through the dilution compartments, ionic and other charged species may be drawn into concentration compartments under the influence of an electric field, such as a DC field. Positively charged species may be drawn toward a cathode, generally located at one end of a stack of multiple dilution and concentration compartments. Negatively charged species may be drawn toward an anode of such devices, generally located at the opposite end of the stack of compartments. The electrodes may be housed in electrolyte compartments that are generally partially isolated from fluid communication with the dilution and/or concentration compartments. Once in a concentration compartment, charged species may be trapped by a barrier of selectively permeable membranes, at least partially defining the concentration compartment. For example, anions may be prevented from migrating further toward the cathode, out of the concentration compartment, by a cation selective membrane. Similarly, cations may be prevented from migrating further toward the anode, out of the concentration compartment, by an anion selective membrane. Once captured in the concentration compartment, trapped charged species may be removed in a concentrate reject stream.

In electrochemical separation devices, the electric field is generally applied to the compartments from a source of voltage and electric current applied to the first and second electrodes. The voltage and current source, referred to herein collectively as the "power supply," may be itself powered by a variety of systems, such as an AC power source, or, for example, a power source derived from solar, wind, or wave power.

At the electrode-liquid interfaces, electrochemical half-cell reactions may occur that initiate and/or facilitate the transfer of ions through the membranes and compartments. The specific electrochemical reactions that occur at the electrode and membrane interfaces may be partially controlled by ionic concentration in the specialized compartments that house the electrode assemblies. For example, a feed to the anode electrolyte compartments that is high in sodium chloride may tend to generate chlorine gas and hydrogen ions, while such a feed to the cathode electrolyte compartment will tend to generate hydrogen gas and hydroxide ions.

Generally, the hydrogen ion generated at the anode compartment may associate with a free anion, such as chloride ion, to preserve charge neutrality and create hydrochloric acid solution. Analogously, the hydroxide ion generated at the cathode compartment may associate with a free cation, such as sodium, to preserve charge neutrality and create sodium hydroxide solution. The reaction products of the electrode compartments, such as generated chlorine gas and sodium hydroxide, may be utilized in the process as needed for disinfection purposes, for membrane cleaning and defouling purposes, and for pH adjustment purposes. Systems and methods disclosed herein may comprise an electrode feed line configured to deliver an electrode stream to the electrodes, an electrode line fluidly connecting the first and second electrodes to each other, and an electrode reject line configured to discharge electrode line waste. The electrodes may be fed with dilute water, for example, water from the first feed line, or with another specialized solution.

In electrochemical separation, maximizing the fraction of feed water that is converted to product water may be a major objective of the process. The fraction of converted feed is referred to herein as "recovery." Recovery is generally expressed as a percentage. Increasing recovery may reduce the capital and operating cost per unit product. For example, a high recovery may reduce the need or extent to which pretreatment of the feed water is necessary, thus reducing the cost of pretreating the feed water. Maximizing production rate and recovery may also be beneficial because many of these applications are driven by water shortage, water use restrictions, or limitations on discharge.

In some embodiments, the method comprises directing the first feed stream to the dilution compartment to produce a product stream and directing the second feed stream to the concentration compartment to produce a reject stream. The product stream may comprise a lower ionic concentration than the feed stream. Contaminant ions in the feed stream migrate towards the concentration compartment, such that, generally, the output concentrate reject may comprise a concentrated majority of the contaminant ions that entered the system in the feed stream.

Electrochemical separation may be used to treat brackish, river, or well water for municipal and industrial use, for example, by desalting the source water. It may also be used to treat wastewater. One non-limiting example of wastewater treated with electrochemical separation is reverse osmosis (RO) reject for reuse or recycle. These water sources may contain multiple types of ions. For example, the feed may include ions that react to form precipitates and scale, such as, $CaCO_3$, $CaSO_4$, and $Mg(OH)_2$. In some embodiments, the feed stream may be pretreated prior to directing to the dilution and/or concentration compartments. For instance, the feed stream may be pretreated by filtration or chemical dosing. In certain embodiments, the feed stream is RO reject. The feed water may have a total dissolved solids (TDS) concentration of less than about 5,000 ppm. For instance, the feed water may have a TDS concentration of less than about 4,000 ppm, less than about 3,000 ppm, or less than about 2,000 ppm TDS.

Certain methods of operating an electrochemical separation device may comprise a once-through pass of feed water through the electrochemical separation device. An electrochemical separation system may be operated with both the first and second streams passing "once-through" their respective compartments to produce the outlet fluids. In such embodiments, a recovery higher than 50% would require the concentrate reject flow rate to be less than the product flow rate. At a recovery of 90%, for example, the concentrate flow rate would be only about 11.1% of the product flow rate.

Alternately, systems and methods disclosed herein may employ recycling the reject stream to the concentration compartment. All or a portion of the reject stream produced by the concentration compartment may be recycled back to the concentration compartment to reduce the required feed into the electrochemical device, and increase recovery. The ionic concentration within the concentration compartment and the recirculation loop may increase as a function of the number of passes of the concentrate reject back into the concentration compartment.

Concentrate recirculation may achieve high recovery while still maintaining flow velocity in the concentrate compartment. The recirculation feed rate may be controlled with a pump within the recirculation loop, for example a pump having a variable frequency drive (VFD) on the motor. To limit the increase in concentration of ions, a fraction of the concentrate stream may be discharged and replaced with a solution having a lower concentration of ions, as will be explained in more detail below.

The flow rate through a dilution or concentration compartment may affect not only the average velocity and the pressure drop within the system, but also the flow distribution within the compartment. For example, in the NEXED™ cross-flow ED device (Evoqua Water Technologies LLC, Lowell, Mass.), low flow regions may develop in the corners of the flow compartments as flow rate decreases. In such low flow regions, the fluid may recirculate or even be stagnant. In a concentration compartment, receiving ions from adjacent dilution compartments, the concentration of potentially scaling ionic species can build up in the low flow regions, potentially causing precipitation and scaling at the membranes.

To prevent precipitation or scaling within the concentration compartment, the method may comprise periodically discharging a volume of the reject stream having a first concentration of ions. In particular, the discharged reject stream may be concentrate reject within a recirculation stream that would otherwise be recycled back to the concentration compartment. The method may further comprise replacing the discharged volume of reject stream with a fluid having a lower concentration of ions than the discharged reject stream. Thus, the overall ionic concentration in the recycle stream and concentration compartment may be reduced. In some embodiments, the discharged volume of reject stream is replaced with an essentially equivalent volume of the second feed stream having a second concentration of ions lower than the first concentration of ions. The second feed stream may be the same as the first feed stream, or may be a separate feed stream. In some embodiments, the discharged volume of reject stream is replaced with an essentially equivalent volume of a third feed stream, having a concentration of ions lower than the first concentration of ions.

Systems and methods disclosed herein may employ periodic discharge of reject in a timed batch cycle. Replacement of the discharged volume may occur gradually or intermittently, as needed. For example, replacement of the discharged volume with an essentially equivalent volume of feed may occur concurrently with discharge of reject. Systems and methods employed herein utilize a batch timed cycle that may lower overall energy consumption, as compared to systems that employ a continuous discharge and replacement of concentrate reject. Batch timed cycles may furthermore reduce the risk of scaling and precipitation while maintaining a higher overall recovery, reduce variations in product quality during reversal, and may allow for longer cycles between polarity reversal or flow reversal.

In certain embodiments, the batch timed cycle comprises periodically discharging reject for a predetermined amount of time and/or to discharge a predetermined volume of reject. Generally, a valve may be opened to allow reject to exit the system for the predetermined discharge time or until the predetermined volume is discharged. For instance, the volume of reject stream may be discharged for between about 0.1 minutes and about 5.0 minutes. In some embodiments, the volume of reject stream is discharged for between about 0.25 minutes and about 3.0 minutes or between about 0.5 minutes and about 2.0 minutes. Additionally, or alternately, the predetermined volume or reject discharged may be calculated based on any one or more of the number of electrochemical modules within the electrochemical separation device, the volume of fluid within the device connection lines, and the volume of fluid within a blending tank. For instance, the predetermined discharge volume may be the volume of fluid in a blending tank within a recycle line. The predetermined discharge volume may be the volume of fluid within a recycle line. In some embodiments, the predetermined discharge volume is between about 50% and about 100% of the liquid volume in the concentration compartment. The predetermined volume may comprise between about 50% and about 100% of the liquid volume in the concentration compartment, blending tank, recycle line, and combinations thereof. The predetermined volume may comprise about 50%, about 60%, about 70%, about 80%, about 90%, or about 100% of the liquid volume in the concentration compartment, blending tank, recycle line, and combinations thereof.

The batch timed cycle may comprise repeating the discharge of reject in predetermined timed cycles. For instance, the discharge may be repeated every 25 minutes. In some embodiments, the discharge is repeated every 5 minutes, every 10 minutes, every 15 minutes, every 20 minutes, every 21 minutes, every 22 minutes, every 23 minutes, every 24 minutes, every 25 minutes, every 26 minutes, every 27 minutes, every 28 minutes, every 29 minutes, every 30 minutes, every 35 minutes, every 40 minutes, or every 45 minutes. In some embodiments, the reject is periodically discharged in cycles of between about 10 minutes and about 30 minutes, between about 15 minutes and about 25 minutes, or between about 20 minutes and 25 minutes.

The predetermined amount of time or predetermined volume for reject discharge and/or the timed batch cycles may be determined or calculated based on a concentration of ions within the concentration compartment. In general, the timing of the discharge of the reject stream is calculated such that the first concentration of ions within the concentration compartment does not increase to a concentration sufficient to form a precipitate or scale. In practice, however, there is evidence that a slight oversaturation of the ionic concentration may be tolerated within the concentrate. In some embodiments, the average concentration of ions within the concentration compartment may be slightly higher than the concentration sufficient to form a precipitate. While not wishing to be bound by any particular theory, it is believed that the concentrate reject may hold an ionic concentration slightly higher than the concentration sufficient for ions to form a precipitate because precipitation does not occur instantaneously.

In certain embodiments, the predetermined amount of time or predetermined volume for reject discharge and the timed batch cycles are determined based on one or more of ionic concentration in the feed stream, flow rate of the feed stream, pH of the feed stream, ionic concentration in the product stream, flow rate of the product stream, pH of the product stream, ionic concentration in the reject stream, flow rate in the reject stream, pH of the reject stream, voltage across the first and second electrodes, electric current between the first and second electrodes, and pressure within the recirculation loop.

The predetermined amount of time or predetermined volume for reject discharge and timed batch cycles may be determined by the measured electric current between the first and second electrodes. In an electrochemical separation device, for a given electrical current, there may be corresponding rates of ionic transfer from the dilution compartment into the concentration compartment. The total amount of ions transferred per unit time may be referred to as the "salt removal rate," which is measured in units of mol/s or equiv/s. Generally, the applied voltage necessary to drive the current depends on the electrical resistance in the ion exchange membranes and in the dilution compartment, concentration compartment, and across the first and second electrodes. The voltage must also overcome the Donnan potential voltage across each membrane due to the difference in concentration on both sides of the membrane. When the difference in concentration is great, the voltage across the first and second electrodes may increase. At a predetermined value, the current may signal a need to discharge reject from the system.

In certain embodiments, the method comprises periodically reversing a polarity of the first and second electrodes. Methods and systems disclosed herein may employ electrode reversal, reversing the voltage applied to the first and second electrodes, such that the positively charged anode becomes a negatively charged cathode and the negatively charged cathode becomes a positively charged anode. The polarity reversal may effectuate a change in the direction of ion transfer within the separation device, whereby the ion transfer reverses direction. Polarity reversal may be used to prevent precipitation of sparingly soluble compounds within the concentration compartments and may also prevent build-up of soluble compounds on the membranes. Devices capable of polarity reversal may be referred to as Electrodialysis Reversal (EDR) devices.

In some embodiments, the timing of the polarity reversal is coordinated with the timing of the periodic discharge of the reject stream. For instance, the polarity reversal may occur essentially concurrently with the periodic discharge of the reject stream. In some embodiments, the polarity reversal may occur slightly after the periodic discharge of the reject stream or slightly before the periodic discharge of the reject stream. In some embodiments, the polarity reversal may occur over a time period essentially as long as the discharge of the reject stream. In other embodiments, the polarity reversal is completed within a time period less than the amount of time of the discharge of the reject stream. Coordinating a timing of the discharge of the reject stream and polarity reversal may increase the ability and efficiency of preventing precipitation and scaling within the electrochemical separation device.

Alternately or additionally to the polarity reversal, the method may further comprise exchanging flow paths of the first feed stream and the second feed stream, such that the first feed stream is directed to the concentration compartment and the second feed stream is directed to the dilution compartment. The polarity reversal and/or the flow path exchange may begin after a number of cycles of concentrate reject discharge. The polarity reversal and flow reversal may effectively change the identity of the compartments, such that the previously-concentrating compartment is now a dilution compartment and the previously-diluting compartment is now a concentration compartment. The flow path exchange of the feed streams may be effectuated with valves configured to redirect the first feed stream and second feed stream. The periodic reversal of the polarity may be coordinated with a timing of the periodic discharge of the reject stream. In some embodiments, the exchanging of the flow paths may be coordinated with the timing of the periodic reversal of the polarity and/or the timing of the periodic discharge of the reject stream. In further cycles, the method may comprise reversing the polarity and/or exchanging fluid flow paths again, such that the electrodes and/or feed streams revert back to their original configuration. Similarly to the previous discussion, the coordination of polarity and flow reversals with the discharge of the reject stream may increase the ability and efficiency of preventing precipitation and scaling within the electrochemical separation device.

For a well-mixed model electrochemical separation device, the change in ionic concentration in the recirculation loop after a reversal can be calculated as a function of time by the following equation:

$$C = C_a - (C_a - C_o)e^{-\left(\frac{t}{\tau}\right)} \tag{1}$$

Where:
C=concentration in the recirculation loop
$\tau$=time constant
t=time after reversal
$C_a$=asymptotic concentration as t→∞
$C_o$=initial concentration.

The concentration increases towards an asymptotic value of $C_a$, which is determined by the discharge rate of the reject and the current between the electrodes.

In some embodiments, the method further comprises blending the reject stream with the second feed stream to produce a reject and second feed blend. The reject and second feed blend may be within the recycle stream. For instance, the reject stream and second feed stream may be blended in a blending tank within the recycle stream. In certain embodiments, the method may comprise discharging reject from the system by discharging a volume of the reject and second feed blend. The method may further comprise replacing the discharged volume of the reject and second feed blend with an essentially equivalent volume of the second feed stream, as previously discussed. The method may comprise delivering a reject and second feed blend to the concentration compartment while the reject and second feed blend is not being discharged. The reject and second feed blend may have a lower concentration of ions than the concentrate reject, thus lowering the overall concentration of ions within the concentration compartment.

In some embodiments, the method further comprises blending the reject stream with a third feed stream to produce a reject and third feed blend. The third feed may have a third concentration of ions lower than the second concentration of ions. In some embodiments, the third feed stream has a concentration of ions essentially equivalent to the second concentration of ions. The third feed stream may comprise an acid or a base. In some embodiments, the third feed stream may comprise one or more chemical dosing compounds. The third feed may be the same fluid as in the second feed stream. In other embodiments, the third feed stream is potable water or comprises a TDS concentration of less than about 2,000 ppm. The reject stream may be blended with both the second feed stream and the third feed stream to produce a reject, second feed, and third feed blend. For instance, the streams may be blended in a blending tank, as previously discussed. In some embodiments, the method may comprise discharging a volume of the reject and third feed blend or of the reject, second feed, and third feed blend. The method may further comprise replacing the discharged volume of the reject and third feed blend or of the reject, second feed, and third feed blend with an essentially equivalent volume of at least one of the second feed stream and the third feed stream, as previously discussed. Discharging the reject and replacing it with the second feed stream or third feed stream, each having a lower concentration of ions than the reject, may reduce the overall ionic concentration of the recycled stream.

In accordance with another aspect, there is provided a water treatment system comprising an electrochemical separation device, as previously described herein. The electrochemical separation device may comprise a dilution compartment having an inlet and a product outlet, a concentration compartment having an inlet and a reject outlet, an ion exchange membrane positioned between the dilution compartment and the concentration compartment, and first and a second electrodes positioned at distal ends of the electrochemical separation device.

The system may further comprise a first feed line fluidly connected to the dilution compartment inlet and a second feed line fluidly connected to the concentration compartment inlet. The first feed line may be configured to direct the first feed stream to the dilution compartment and the second feed line may be configured to direct the second feed stream to the concentration compartment. In some embodiments, the first feed line and second feed line split from a general feed line and carry the same feed stream. The system may comprise a recycle line fluidly connected to the reject outlet and the inlet of the concentration compartment. The recycle line may be configured to recirculate concentrate reject within the system, as previously discussed. The various feed lines and recycle line may comprise any number of pumps, valves, or three way valves to drive and direct the fluid flow through the system. The valves may be automatic valves, controlled by one or more control modules, manually controlled, or any combination thereof. For example, the lines may comprise pumps and valves as illustrated in the figures and described in more detail below.

In some embodiments, the system further comprises a control module in electrical communication with a valve positioned on the recycle line. The control module may be configured to periodically discharge a volume of concentrate reject from the recycle line in a batch timed cycle by controlling the opening and closing of the valve. The control module may further be configured to deliver an essentially equivalent volume of a more dilute feed to the concentration compartment. The control module may deliver second feed stream to the concentration compartment or a separate, third feed stream to the concentration compartment. In some embodiments, the control module is configured to deliver feed water to the recycle line by opening a feed valve or by activating a feed pump.

The control module may be configured to act on a timer and/or in response to a measurement of one or more of ionic concentration in the feed stream, flow rate of the feed stream, pH of the feed stream, ionic concentration in the product stream, flow rate of the product stream, pH of the product stream, ionic concentration in the reject stream, flow rate in the reject stream, pH of the reject stream, voltage across the first and second electrodes, electric current between the first and second electrodes, and pressure within the recycle line. For instance, the control module may be configured to discharge reject if the ionic concentration within the recycle line reaches a concentration sufficient to form a precipitate. The control module may be configured to discharge reject if the pH of the reject within the recycle line reaches a predetermined pH. The predetermined pH may be such that when combined with the measured ionic concentration of the reject, the ions will form a precipitate. The control module may further be configured to discharge concentrate reject when the pressure within the recycle line reaches a predetermined pressure threshold. Furthermore, the control module may be configured to discharge reject if any combination of the parameters are met in the feed stream, for example, when the feed stream reaches a predetermined ionic concentration and/or pH.

The control module may be configured to discharge concentrate reject on a calculated timed cycle based on one or more system inputs, and may also be configured to discharge concentrate reject if any measured parameter exceeds a predetermined value. Generally, the timed cycle may be calculated based on system inputs including any one or more of feed water type, flow rate, pressure, ionic concentration, and pH of the feed stream, voltage delivered to the first and second electrodes, and current applied across the electrochemical separation device.

The control module may be configured to discharge concentrate reject when the pH of the reject or product reaches a predetermined threshold. In some embodiments, the control module may discharge concentrate reject when the pH of the product or reject is less than about 3 or more than about 10. In other embodiments, the control module may discharge concentrate reject when the pH of the product or reject is less than about 2 or more than about 11. Specifically, the control module may discharge concentrate reject when the pH of the product or reject falls outside of the about 3 to about 10 range, unless the electrochemical separation device is undergoing a polarity or flow reversal, in which case the control module may allow the pH of the product or reject to be between about 2 to about 11 before discharging. In some embodiments, the predetermined threshold pH is determined by the precipitate(s) of concern. For instance, if the precipitates of concern include $CaCO_3$ and $Mg(OH)_2$, the control module may be configured to discharge reject when the pH is greater than about 6. If the precipitate of concern includes $CaSO_4$, the control module may be configured to discharge reject when the pH falls outside of the about 3 to about 10 range.

The control module may furthermore be configured to discharge concentrate reject when the ionic concentration of the reject or product reaches a predetermined threshold. For example, the control module may discharge concentrate reject when the TDS concentration of the reject is greater than about 8,000 ppm. The control module may discharge concentrate reject when the TDS concentration is greater than about 9,000 ppm, greater than about 10,000 ppm, greater than about 11,000 ppm, greater than about 11,500 ppm, greater than about 12,000 ppm, greater than about 12,100 ppm, greater than about 12,200 ppm, greater than about 12,300 ppm, greater than about 12,400 ppm, or greater than about 12,500 ppm.

The control module may further be configured to discharge concentrate reject when the pressure within the recycle line reaches a predetermined value or pressure threshold. The pressure threshold may be reached when the average or absolute pressure within the recycle line reaches the predetermined value. The control module may further be configured to discharge concentrate reject when the pressure within the concentration compartment exhibits a predetermined differential. Specifically, the predetermined pressure differential across the concentration compartment may be measured as a pressure drop across the concentration compartment. The pressure may be measured at two or more points within the concentration compartment and/or recycle line to determine the pressure differential.

The system may further comprise one or more sensors. In some embodiments, the system comprises a sensor fluidly connected to at least one of the reject outlet and the product outlet and configured to measure at least one of ionic concentration, pH, and flow rate of the concentrate reject or a product. In some embodiments, the system comprises one or more sensors fluidly connected to the recycle line and/or concentration compartments, configured to measure pressure within the recycle line or concentration compartment. In some embodiments, the system comprises a sensor electrically connected to the first electrode and the second electrode and configured to measure voltage and/or current across the electrodes.

The control module may be electrically connected to the one or more sensors and configured to act in response to a measurement received from the one or more sensors. For instance, the control module may be electrically connected to the reject outlet and/or product outlet sensor and configured to discharge a volume of concentrate reject in response to the measurement of at least one of the ionic concentration, the pH, and the flow rate of the reject or product. In some embodiments, the control module is electrically connected the recycle line sensor and configured to discharge a volume of concentrate reject in response to the measurement of the pressure within the recycle line or pressure differential within the recycle line and/or concentration compartment. In some embodiments, the control module is electrically connected to the first and second electrode sensor and configured to discharge a volume of concentrate reject in response to the measurement of one of the voltage and current across the electrodes.

The system may comprise one control module in electrical communication with any number of sensors, or may comprise one control module in electrical communication with each sensor. The system may further comprise a control module hub connected to any number of control modules. In some embodiments, the control module(s) and sensor(s) are connected by one or more wires. In some embodiments, the control module(s) and sensor(s) are connected wirelessly. Similarly, the one or more control modules may be connected to the one or more valves on the recycle line by wires or wirelessly. In some embodiments, a control module is comprised within a valve, such that the valve itself is configured to open and close automatically, on a timer, or in response to a received measurement from a sensor.

The system may further comprise a control module configured to control one or more of flow rate, pressure, and voltage delivered to the first and second electrodes. Control of flow rate and pressure within an electrochemical separation device and system may be complex and challenging. Generally, the system may comprise a pressure regulator in the recycle line configured to maintain a constant pressure within the recycle line. The recycle line may further comprise a pump configured to coordinate with the pressure regulator in maintaining the constant pressure within the recycle line. The first and second feed flow rates may be controlled by a pump or a valve on the first or second feed lines or on a general feed line that splits to form the first and second feed lines. The flow rate of the second feed stream may determine the pressure drop through the concentration compartment, which in turn may determine the concentrate reject flow rate out of the concentration compartment and through the recycle line. The difference between the feed stream pressures and the output stream pressures may generally be maintained below a predetermined set value to minimize cross-leak between the system compartments. Since many process inputs can affect the multiple process outputs, control within the system, for example, control of flow rates and pressures, may require iterative adjustment of inputs and may be controlled by a control module.

In certain embodiments the system further comprises a blending tank positioned within the recycle line. The blending tank may be a tank, vessel, chamber, or compartment configured to receive and blend the concentrate reject and a feed stream, to produce a blended stream having a lower concentration of ions than the concentrate reject. The blending tank may be an open tank or may be an enclosed, air pressurized tank. The enclosed tank may utilize compressed air or compressed gas. As the ionic concentration in the concentrate reject increases, the system may require blending of concentrate reject with a more dilute stream to prevent precipitation and scaling within the system lines or on the membranes. The blended fluid may be discharged from the tank by gravity or by applied air pressure.

In some embodiments, the blending tank is fluidly connected to the recycle line and to the second feed line. The blending tank may be configured to receive and blend concentrate reject and second feed, to produce a reject and second feed blend. The system may comprise a valve positioned downstream from the blending tank and the control module may be configured to periodically discharge a volume of the reject and second feed blend through the downstream valve. The valve may be positioned on a blending tank outlet line or within the recycle line, downstream from the blending tank. The control module may further be configured to deliver the volume of second feed to the blending tank to replace the discharged volume of the reject and feed blend. The volume of dilute feed delivered to the blending tank may be fluidly connected to the blending tank before eventually reaching the concentration compartment.

In some embodiments, the system comprises a sensor fluidly connected to the blending tank and configured to measure at least one of ionic concentration and pH of the reject and second feed blend within the blending tank. The control module may further be configured to discharge reject and second feed blend from the blending tank in response to a measurement of the ionic concentration or pH of the reject and second feed blend.

In accordance with certain embodiments, the system may comprise a valve positioned upstream from the blending tank. The upstream valve may be configured to selectively discharge the concentrate reject from the system or to deliver the concentrate reject to the blending tank. In some embodiments, the control module may be configured to discharge concentrate reject from the recycle line in response to a measurement of the ionic concentration and/or pH of the reject and second feed blend.

In some embodiments, the system may comprise a blending tank positioned within the recycle line and configured to receive and blend the concentrate reject and at least one of the second feed and a third feed, to produce a reject and feed blend. The third feed may be a dilute feed stream having a lower ionic concentration than the second feed and/or than the reject and second feed blend. In some embodiments, the third feed stream may comprise an acid or a base. The system may be fluidly connected to both the second feed line and the third feed line. The system may comprise one or more three way valves positioned upstream from the blending tank, configured to direct one of the second feed and the third feed into the blending tank through a common input line.

The system may further comprise a parallel recycle line configuration, wherein at least one of the parallel lines comprises a blending tank. The parallel configuration may allow concentrate reject having a lower ionic concentration to recirculate within the recycle line, while concentrate reject having a higher ionic concentration may be blended with a feed stream in a tank before being recirculated back to the concentration compartment. The system may comprise a control module configured to divert concentrate reject to the concentration compartment or to the blending tank in response to a measurement of ionic concentration or pH of the concentrate reject.

The system may further comprise more than one blending tank positioned within the recycle line in a parallel configuration. In some embodiments, at least one of the more than one blending tank is configured to be in fluid communication with the concentration compartment while at least one of the more than one blending tank is configured to be on stand-by. The tank that is on stand-by may be configured to receive at least one of the concentrate reject, the second feed, or the third feed. The parallel configuration is controlled such that, generally, at least one tank is in use while at least one tank is being prepared for use. Such a configuration may allow the system to perform according to the batch timed cycles with no delay.

The function and advantages of the embodiments discussed above and other embodiments of the invention can be further understood from the description of the figures below, which further illustrate the benefits and/or advantages of the one or more systems and techniques of the invention but do not exemplify the full scope of the invention.

Figure 1:
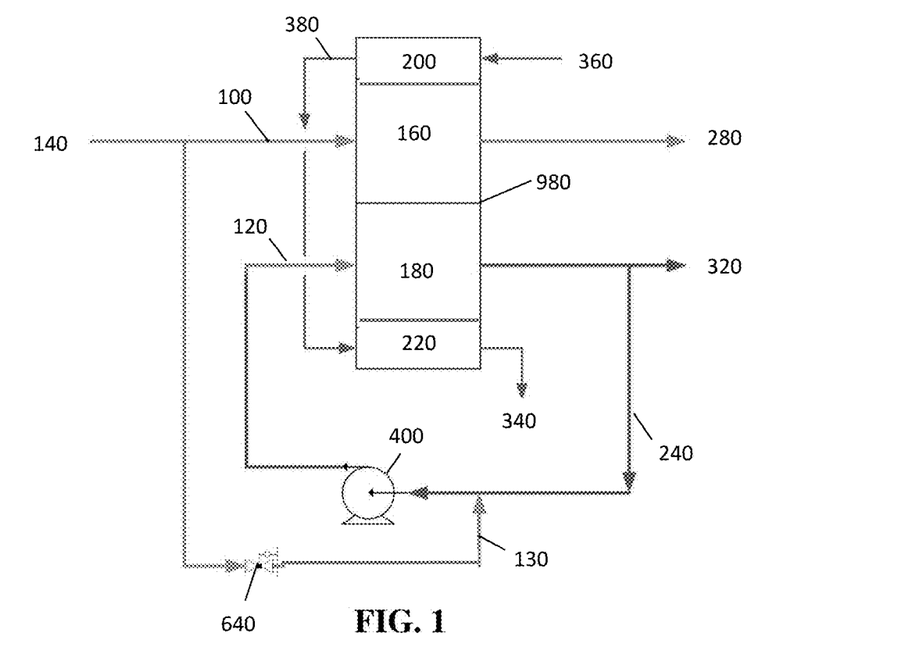
FIG. 1 is a schematic drawing of a water treatment system, in accordance with certain embodiments.

As shown in the exemplary schematic drawing of FIG. 1, a water treatment system comprises an electrochemical separation device comprising a dilution compartment 160 having an inlet 260 (shown in FIG. 4) and a product outlet 280, a concentration compartment 180 having an inlet 300 (shown in FIG. 4) and a reject outlet 320, an ion exchange membrane 980 positioned between the dilution compartment 160 and the concentration compartment 180, and first and a second electrodes 200, 220 positioned at distal ends of the electrochemical separation device. The system may comprise an electrode feed 360, electrode reject 340, and electrode line 380 fluidly connecting the first and second electrodes 200, 220. The system comprises a first feed line 100 fluidly connected to the dilution compartment 160 and a second feed line 120, 130 fluidly connected to the concentration compartment 180. The second feed line may comprise an upstream end 130 and a downstream end 120. The downstream end of the second feed line 120 may be connected to the concentration compartment. The upstream end of the second feed line 130 may be connected to a feed inlet. First and second feed lines, 100 and 130, respectively, may split from a general feed line 140. Second feed line 130 comprises a valve 640 configured to allow the feed stream to reach the concentration compartment 180, through recycle line 240. The recycle line 240 may be fluidly connected to the reject outlet 320 and the concentration compartment 180. The recycle line may further comprise a pump 400 configured to pump the concentrate reject and/or second feed stream to the concentration compartment 180.

Figure 2:
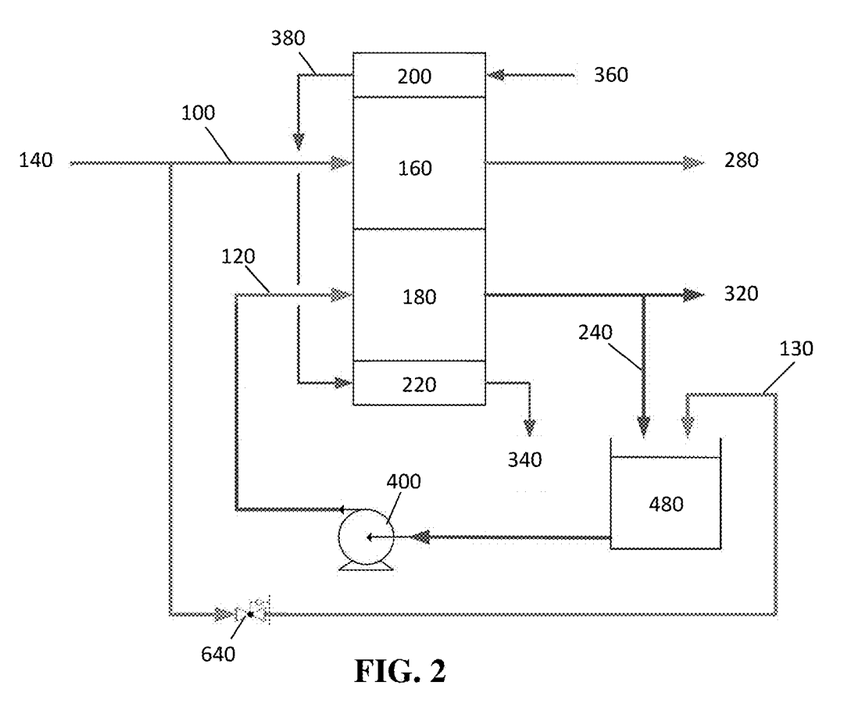
FIG. 2 is a schematic drawing of a water treatment system comprising a blending tank, in accordance with certain embodiments.

Referring now to the exemplary schematic drawing of FIG. 2, the system may comprise a blending tank 480 within recycle line 240. The blending tank 480 may be configured to receive concentrate reject through the recycle line 240 and feed stream through second feed line 130 to produce a reject and feed blend. The blend may be pumped to the concentration compartment 180 through pump 400.

Figure 3:
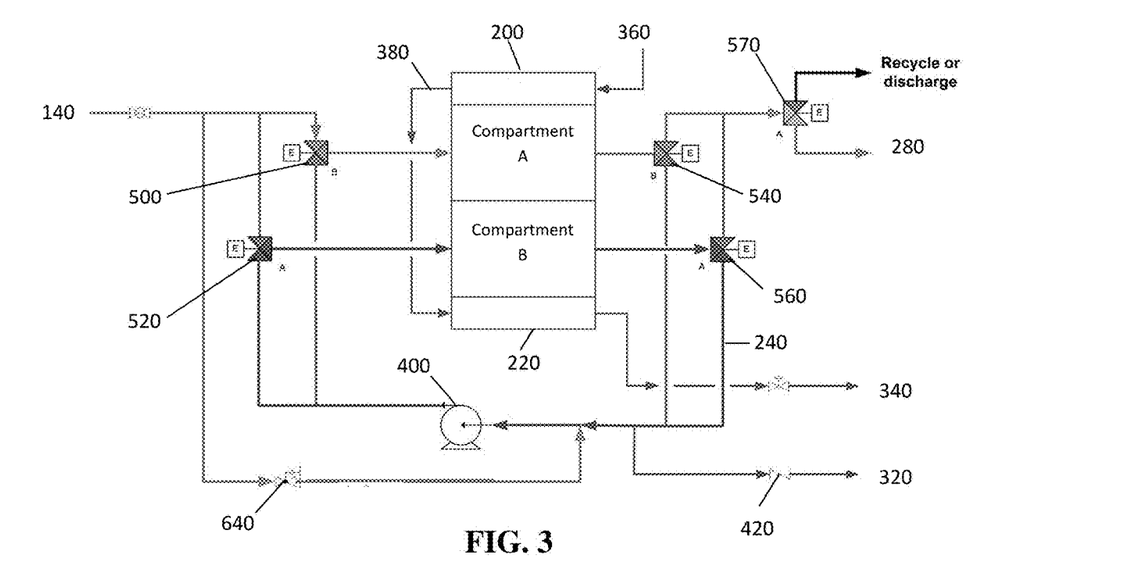
FIG. 3 is a schematic drawing of a water treatment system capable of reversing the flow paths of the first and second feed streams, in accordance with certain embodiments.

In certain embodiments, such as the one shown in the exemplary schematic drawing of FIG. 3, the system may be configured to exchange flow paths of the first feed stream and the second feed stream. The system may comprise a series of three way valves, 500, 520, 540, and 560, configured to effectuate the flow path exchange of the feed streams. Initially, feed three way valve 500 may be configured to direct the first feed stream to compartment A, while feed three way valve 520 directs the second feed stream to compartment B. In this initial conformation, compartment A may act as the dilution compartment, such that the outlet three way valve 540 directs product water to product line 280. Compartment B may act as the concentration compartment, such that outlet three way valve 560 directs reject to the recycle line 240. After the flow path exchange, feed three way valve 500 may be configured to the direct second feed stream to compartment A, while feed three way valve 520 directs the first feed stream to compartment B. In this conformation, compartment A may act as the concentration compartment, directing concentrate reject to the recycle line 240 through outlet three way valve 540, while compartment B may act as the dilution compartment, directing product to product outlet 280 through outlet three way valve 560.

Immediately after a flow path exchange, a portion of the water exiting the now-dilution compartment may be waste having a high concentration of contaminants. Thus, the outlet three way valves 540 and 560 may be switched on a delay after inlet three way valves 500 and 520 are switched to exchange inlet fluid flow paths. In some embodiments, a portion of the now-product water may be discharged through a recycle or discharge line. A three way valve 570 may selectively divert now-product water to the product outlet 280 or the recycle or discharge outlet. The system, as shown in FIG. 3, may comprise valve 420 on reject line 320 configured to discharge concentrate reject from the system.

Figure 4:
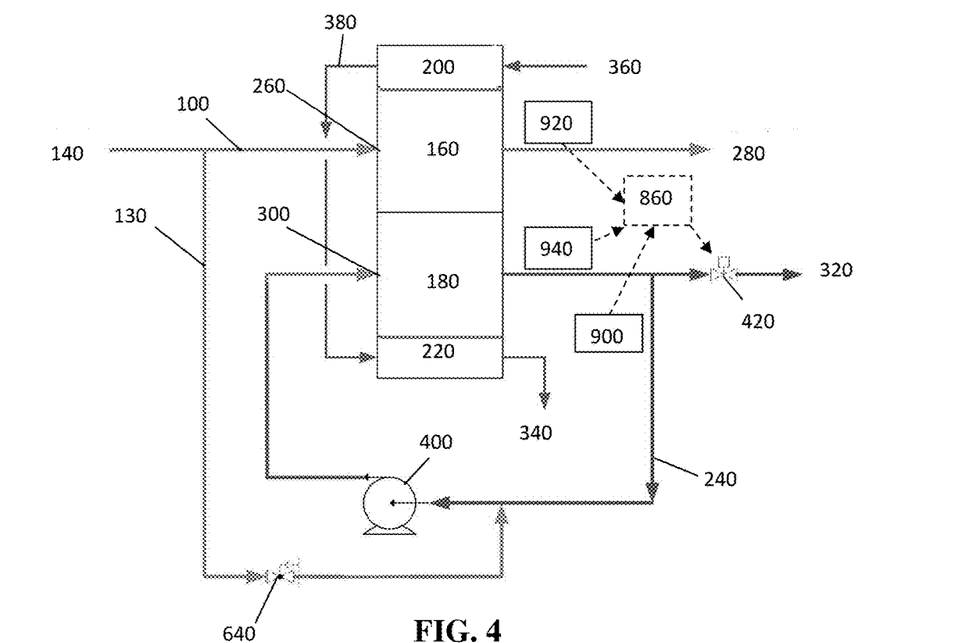
FIG. 4 is a schematic drawing of a water treatment system comprising a control module, in accordance with certain embodiments.

As shown in the exemplary schematic drawing of FIG. 4, the system may further comprise sensors 900, 940, and 920, fluidly connected to the reject outlet 320 (sensor 940), the product outlet 280 (sensor 920), and the recycle line 240 (sensor 900). The reject outlet sensor and product outlet sensor, 940 and 920, respectively, may be configured to measure ionic concentration, pH, and flow rate of the concentrate reject and/or product. The recycle line sensor 900 may be configured to measure pressure within the recycle line 240. Sensors 940, 920, and 900 may be connected to control module 860. The control module 860 may be electrically connected to the sensors 940, 920, and 900 and to the valve 420. Control module 860 may be configured to discharge a volume of concentrate reject through valve 420 in response to a measurement received from at least one of the sensors 940, 920, and 900.

Figure 5:
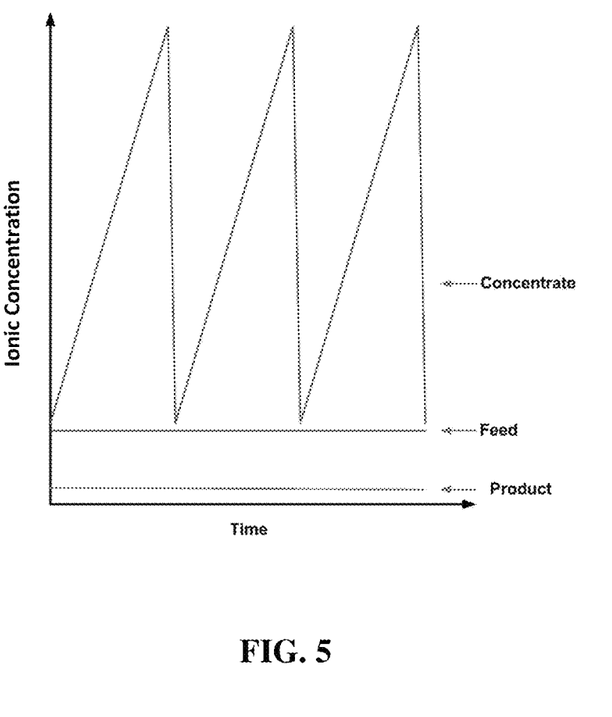
FIG. 5 is a graph of the change in ionic concentration of the concentrate reject, feed, and product of an electrochemical separation device over time, in accordance with certain embodiments of the method of operating an electrochemical separation device disclosed herein.

The control module 860 may also be configured to discharge a volume of concentrate reject through valve 420 periodically on a batch timed cycle. Such a periodic, batch discharge of concentrate reject from the recycle line will result in sharp peaks and sharp drops of contaminant concentration in the concentrate, as shown in the graph of FIG. 5. The batch cycle may be timed such that the periodic discharge occurs when the ionic concentration and/or pH in the reject reaches a concentration and/or pH sufficient to form a precipitate. Accordingly, the sharp decline in ionic concentration may prevent scaling and precipitation within the concentration compartment.

Figure 6:
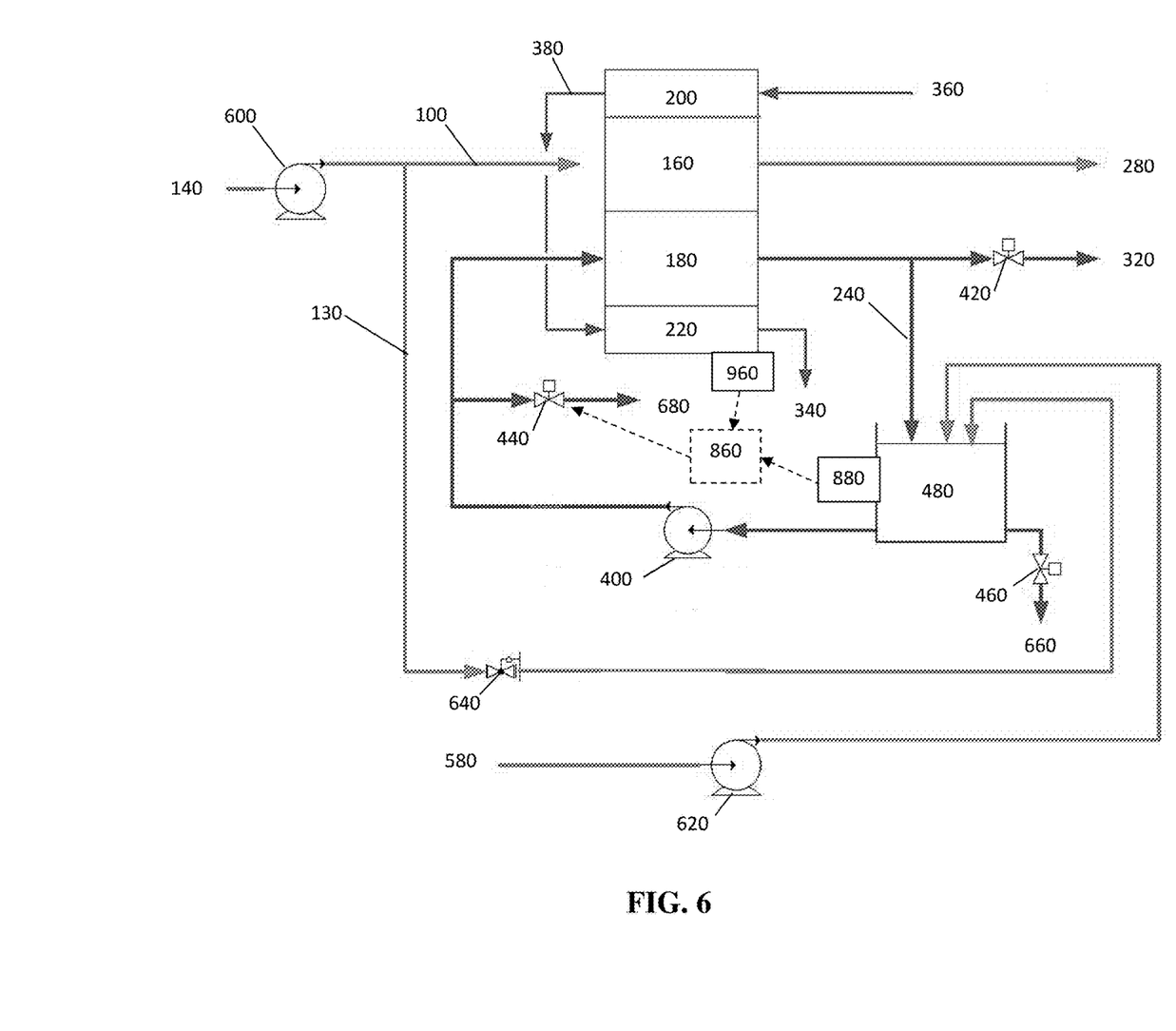
FIG. 6 is a schematic drawing of a water treatment system comprising a blending tank and a third feed stream, in accordance with certain embodiments.

Referring now to the exemplary schematic drawing of FIG. 6, the control module 860 may be electrically connected to sensors 880 and 960. Sensor 880 may be fluidly connected to the blending tank 480 and configured to measure ionic concentration or pH of the fluid within the blending tank 480. Sensor 960 may be electrically connected to the first and second electrodes 200, 220 and configured to measure a voltage or current across the electrodes 200, 220. Control module 860 may be connected to valve 440 and configured to discharge reject and feed blend from the recycle line in response to a measurement received from any of the sensors 880, 960, 900, 940, 920, as previously discussed with respect to valve 420. Alternately, or additionally, control module 860 may be electrically connected to valves 420 and/or 460 and configured to discharge reject or blend through valves 420, 460. The system may comprise one or more control modules connected to the various sensors and valves of the system.

As further shown in the exemplary schematic drawing of FIG. 6, the system may include a third feed line 580 in fluid communication with the recycle line 240. In the embodiment of FIG. 6, the third feed line 580 is fluidly connected to the blending tank 480. The second feed line 130 is also fluidly connected to the blending tank 480. Third feed line 580 may include pump 620. The system may further comprise one or more valves 440, 460 downstream from the blending tank 480. Valves 440 and 460 are configured to discharge a fluid blend from the system through lines 680 and 660. The system may further comprise a pump 600 on the general feed line 140.

Figure 7:
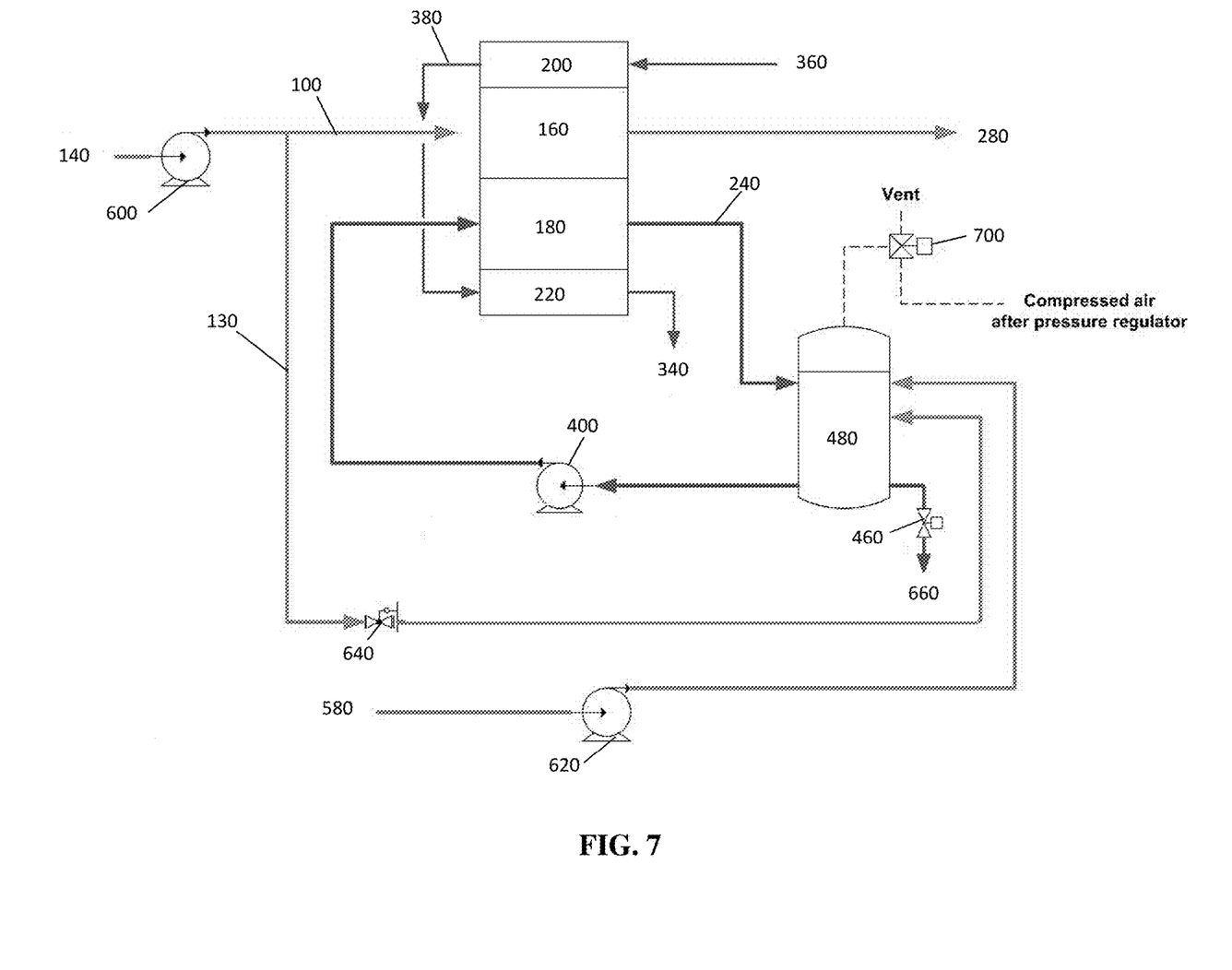
FIG. 7 is a schematic drawing of a water treatment system comprising an enclosed blending tank, in accordance with certain embodiments.

As shown in the exemplary embodiment of FIG. 7, the blending tank 480 may be an enclosed vessel. The system may further comprise a vent and an air valve 700 configured to deliver compressed air or gas to the blending tank 480.

Figure 8:
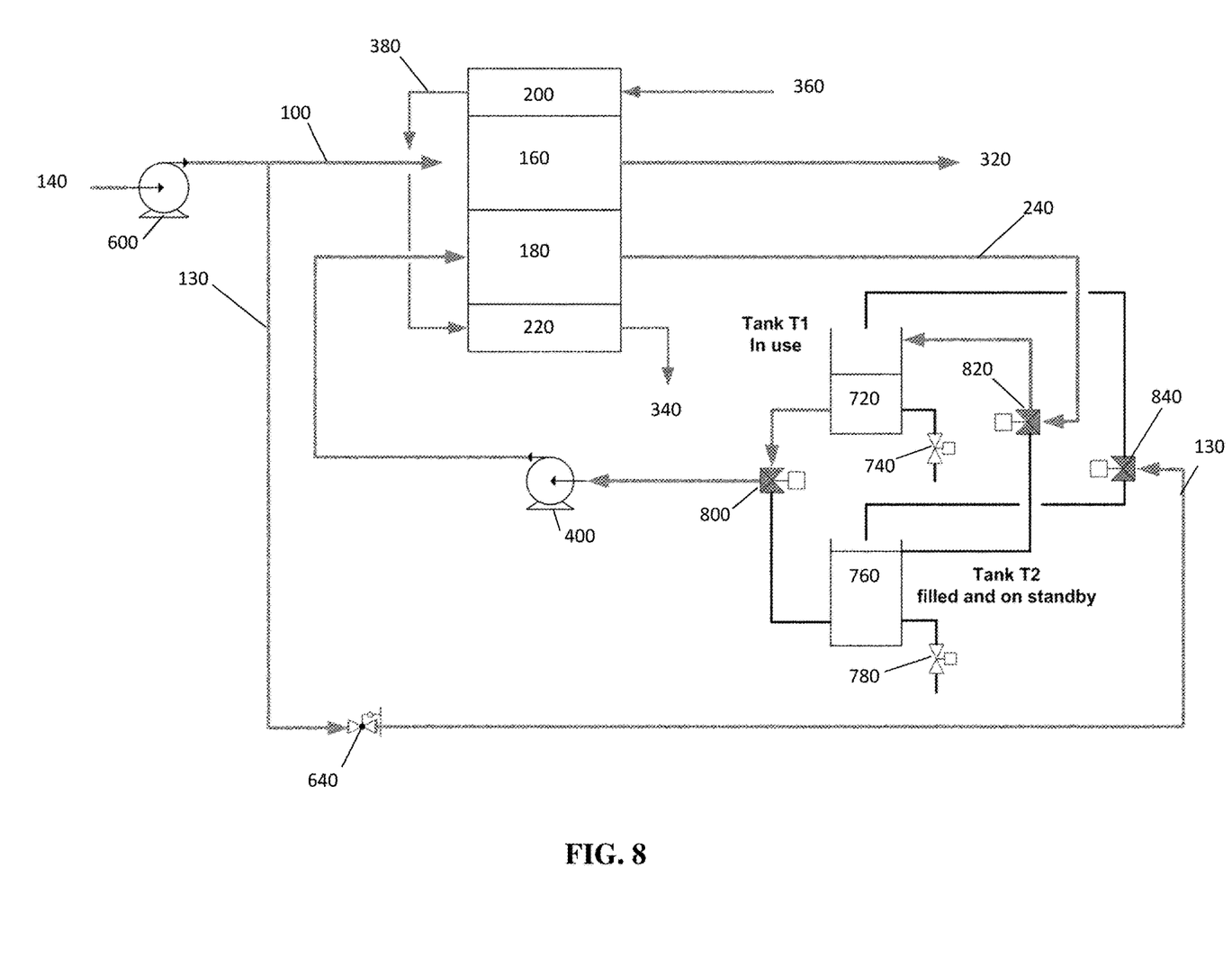
FIG. 8 is a schematic drawing of a water treatment system comprising two blending tanks arranged in parallel, in accordance with certain embodiments.

In certain embodiments, such as the exemplary schematic drawing of FIG. 8, the system comprises more than one tank, 720, 760 within the recycle line 240, arranged in a parallel configuration. In the embodiment shown in FIG. 8, tank T1 720 is in fluid communication with the concentration compartment 180, while tank T2 760 is on stand-by. In this configuration, downstream three way valve 800 may allow fluid connection between in-use tank 720 and concentration compartment 180 and block fluid connection between stand-by tank 760 and concentration compartment 180. Upstream three way valves 820 and 840 may allow fluid communication between the recycle line 240 and second feed line 130 and stand-by tank 760, while blocking fluid communication between recycle line 240 and second feed line 130 to in-use tank 720. Downstream valves 740 and 780 may be configured to discharge fluid blend from the tanks 720 and 760, respectively.

Figure 10:
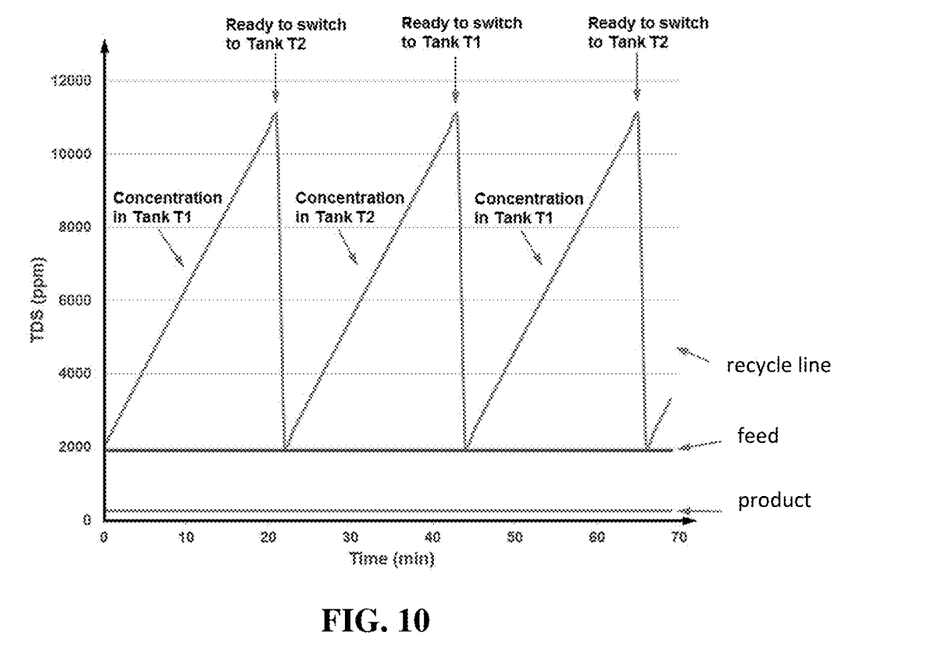
FIG. 10 is a graph of the change in TDS concentration over time of the recycle line, feed, and product of a system comprising two blending tanks arranged in parallel, in accordance with certain embodiments.

The graph of FIG. 10 shows the change in TDS concentration in the recycle line over time. The concentration may increase in the tank that is receiving concentrate reject until it reaches a predetermined TDS concentration or until a predetermined period of time has gone by. At this point, the blend fluid in the tank may be discarded, and the system simultaneously the system switches the tank in fluid communication with the concentration compartment and the tank on stand-by. The cycle may repeat continuously.

EXAMPLES

Example 1: Prophetic Example of a Method of Operating a Water Treatment System Comprising an Electrochemical Separation Device The example refers to a water treatment system comprising an automated valve in the reject stream. The valve may be fully closed immediately after start-up. The first feed and second feed are directed to the dilution and concentration compartment, respectively. If the current in each compartment is constant, the ionic concentration in the recycle line is expected to increase linearly, assuming a well-mixed model. When the concentration reaches a predetermined level, the reject vale may be fully opened to discharge the concentration reject in the recycle line, while fresh feed enters the recycle line through a pressure regulating valve. The batch cycle may be repeated, resulting in a saw tooth pattern in ionic concentration within the concentration compartment. The peak concentration may be set based on the potential for precipitation, scaling, and/or organic fouling. The cycles may be timed based on the measured or calculated peak ionic concentration.

Example 2: Concentrate Recirculation in a System Having a Closed Tank

Figure 9:
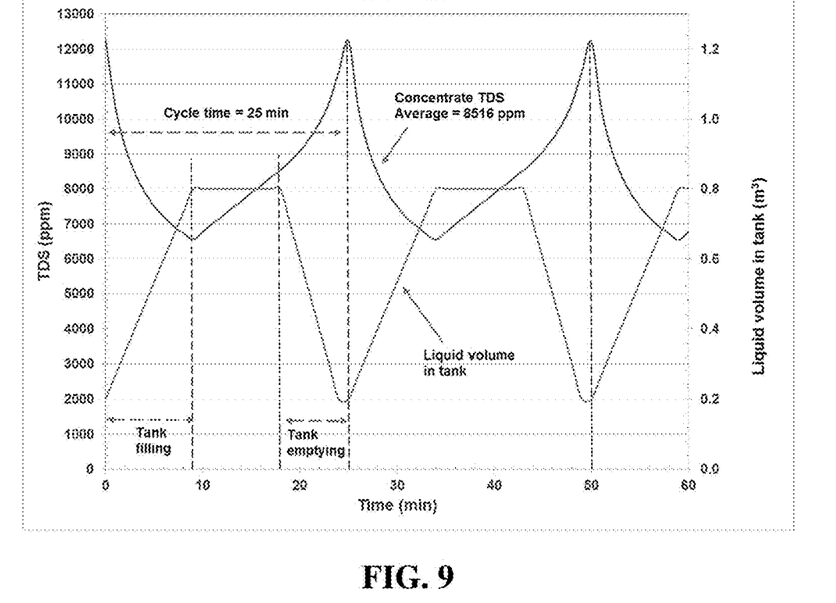
FIG. 9 is a graph of the change in total dissolved solids (TDS) concentration and liquid volume in the blending tank over time, in accordance with certain embodiments of the method of operating an electrochemical separation device disclosed herein.

An electrochemical separation device having an enclosed tank within the concentrate recirculation loop was simulated with a computer program. The graph of FIG. 9 summarizes the results presented below. The system feed was simulated at 2,000 ppm TDS with a flow rate of 6.0 m$^3$/hr. The current applied was simulated at 5.1 A with a current efficiency of 80%. The periodic discharge batch cycle time was set to 25 minutes, wherein the tank was filling for about 9 minutes, remained at constant volume for about 9 minutes, and was emptied for about 7 minutes. The feed rate into the tank was simulated at a flow rate of 4.0 m$^3$/hr and the discharge rate from the tank was simulated at a flow rate of 6.0 m$^3$/hr. The upper limit on TDS concentration to prevent precipitation was 12,200 ppm. The concentrate in the system had a TDS concentration that ranged between about 12,200 ppm and about 6,500 ppm during the timed cycles. The average TDS concentration in the system was about 8,516 ppm. The system performed at a TDS removal rate of 90%, such that the product had a TDS concentration of 211 ppm. The system performed with an overall recovery of 81%.

Example 3: Concentrate Recirculation in a System Having Two Tanks

An electrochemical separation device having two tanks within the concentrate recirculation loop was simulated with a computer program. The graph of FIG. 10 summarizes the results presented below. The system feed was simulated at 2,000 ppm, and the initial concentration in the tanks was also simulated at 2,000 ppm. Each tank had a volume of 0.4 m$^3$. The feed flow rate into the tanks was simulated at 6.0 m$^3$/hr. Both tanks (T1 and T2) were filled with system feed at the beginning of operation. Tank T1 in the graph was initially in fluid communication with the concentration compartment while Tank T2 was on standby. After Tank T1 became saturated, the system was switched so that Tank T2 was in fluid communication with the concentration compartment, while Tank T1 was isolated. The liquid in Tank T1 was dumped and replaced with the system feed. Tank T1 was then placed on standby for the next cycle. The current applied was simulated at 5 A. The periodic discharge batch cycle time was set to 22 minutes. The upper limit on TDS concentration was 11,070 ppm in the recycle line. The concentrate in the system had a TDS concentration that ranged between about 11,070 ppm and 2,000 ppm. The system performed at a TDS removal rate of 87.7%, such that the product had a TDS concentration of 245 ppm. The system performed with an overall recovery of 84.6%.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of an electrochemical water treatment system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the methods may involve operating an electrochemical separation device. Accordingly the foregoing description and figures are by way of example only. Further the depictions in the figures do not limit the disclosures to the particularly illustrated representations.

While exemplary embodiments are disclosed herein, many modifications, additions, and deletions may be made therein without departing from the spirit and scope of the inventive aspects and their equivalents, as set forth in the following claims.

What is claimed is:

1. A method of operating an electrochemical separation device comprising a dilution compartment, a concentration compartment, an ion exchange membrane positioned between the dilution compartment and the concentration compartment, first and second electrodes, a first feed stream fluidly connected to the dilution compartment, a second feed stream fluidly connected to the concentration compartment, and a concentration compartment recycle stream the method comprising:

directing the first feed stream to the dilution compartment to produce a product stream;

directing the second feed stream to the concentration compartment to produce a reject stream;

recycling the reject stream to the concentration compartment;

measuring electric current between the first and second electrodes;

periodically discharging a volume of the reject stream having a first concentration of ions in a batch cycle; and replacing the discharged volume of the reject stream with an essentially equivalent volume of the second feed stream having a second concentration of ions lower than the first concentration of ions, the batch cycle being determined by the electric current between the first and second electrodes, the method comprising discharging the volume of the reject stream when the electric current decreases to reach a predetermined value.

2. The method of claim 1, further comprising periodically reversing a polarity of the first and second electrodes, and coordinating a timing of the periodic discharge of the reject stream with a timing of the periodic reversal of the polarity.

3. The method of claim 2, further comprising exchanging flow paths of the first feed stream and the second feed stream in coordination with the timing of the periodic reversal of the polarity, such that the first feed stream is directed to the concentration compartment and the second feed stream is directed to the dilution compartment.

4. The method of claim 1, further comprising blending the reject stream with the second feed stream to produce a reject and second feed blend upstream from recycling the reject stream to the concentration compartment, wherein recycling the reject stream to the concentration compartment comprises recycling the reject and second feed blend to the concentration compartment.

5. The method of claim 4, wherein periodically discharging the volume of the reject stream comprises periodically discharging a volume of the reject and second feed blend, and wherein replacing the discharged volume of the reject stream comprises replacing the discharged volume of the reject and second feed blend with an essentially equivalent volume of the second feed stream.

6. The method of claim 1, further comprising blending the reject stream with a third feed stream to produce a reject and third feed blend upstream from recycling the reject stream to the concentration compartment, wherein the reject stream is recycled to the concentration compartment by recycling the reject and third feed blend to the concentration compartment.

7. The method of claim 6, wherein the volume of the reject stream is periodically discharged by periodically discharging a volume of the reject and third feed blend, and wherein the discharged volume of the reject stream is replaced by replacing the discharged volume of the reject and third feed blend with an essentially equivalent volume of the second feed stream.

8. The method of claim 1, further comprising periodically discharging the volume of the reject stream for about 0.5 minutes to about 2.0 minutes in batch cycles of about 15 minutes to about 25 minutes.

9. The method of claim 1, wherein the batch cycle is determined by the ionic concentration of the reject stream, the method comprising periodically discharging the volume of the reject stream when the first concentration of ions reaches a concentration sufficient to form a precipitate.

10. The method of claim 9, comprising periodically discharging the volume of the reject stream when the first concentration of ions is a concentration of greater than about 12,000 ppm total dissolved solids (TDS).

11. The method of claim 9, further comprising measuring the ionic concentration of the reject stream.

* * * * *